US010542568B2

United States Patent
Ashraf et al.

(10) Patent No.: US 10,542,568 B2
(45) Date of Patent: Jan. 21, 2020

(54) ACCESS CHANNEL MANAGEMENT FOR WIRELESS COMMUNICATION DEVICES

(71) Applicant: Telefonaktiebolaget LM Ericsson (publ), Stockholm (SE)

(72) Inventors: Shehzad Ali Ashraf, Aachen (DE); Ismet Aktas, Neuss (DE); Junaid Ansari, Fürth (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

(21) Appl. No.: 15/767,423

(22) PCT Filed: Oct. 23, 2015

(86) PCT No.: PCT/EP2015/074635
§ 371 (c)(1),
(2) Date: Apr. 11, 2018

(87) PCT Pub. No.: WO2017/067607
PCT Pub. Date: Apr. 27, 2017

(65) Prior Publication Data
US 2018/0295653 A1    Oct. 11, 2018

(51) Int. Cl.
*H04W 74/08* (2009.01)
*H04W 74/02* (2009.01)
*H04W 4/00* (2018.01)
*H04W 28/02* (2009.01)
*H04W 48/06* (2009.01)
*H04W 48/16* (2009.01)
*H04W 72/10* (2009.01)
(Continued)

(52) U.S. Cl.
CPC ......... *H04W 74/0875* (2013.01); *H04W 4/00* (2013.01); *H04W 28/0268* (2013.01);
(Continued)

(58) Field of Classification Search
CPC . H04W 74/02; H04W 74/06; H04W 74/0808; H04W 4/00; H04W 4/70;
(Continued)

(56) References Cited

U.S. PATENT DOCUMENTS

2008/0144493 A1* 6/2008 Yeh .................. H04W 52/50
370/230
2010/0014423 A1* 1/2010 Furuskar ............ H04W 74/02
370/235
(Continued)

FOREIGN PATENT DOCUMENTS

WO    2015071000 A1    5/2015

OTHER PUBLICATIONS

3GPP TR 36.881 V0.3.1 (Oct. 2015), 3rd Generation Partnership Project; Technical Specification Group Radio Access Network; Evolved Universal Terrestrial Radio Access (E-UTRA); Study on latency reduction techniques for LTE (Release 13), Oct. 2015, pp. 1-59.
(Continued)

*Primary Examiner* — Ajay Cattungal
(74) *Attorney, Agent, or Firm* — Murphy, Bilak & Homiller, PLLC

(57) ABSTRACT

A method of managing access to a wireless communication network (101), comprising: a wireless communication device (101a, 101b, 101c) selecting (S2) an access channel out of a plurality of access channels (CH1, CH2, CH3) for transmission of a data packet based on a traffic type out of a plurality of traffic types (T1, T2, T3) assigned to the data packet.

24 Claims, 11 Drawing Sheets

(51) Int. Cl.
*H04W 72/14* (2009.01)
*H04W 74/06* (2009.01)
*H04W 4/70* (2018.01)
*H04W 72/04* (2009.01)

(52) U.S. Cl.
CPC ....... *H04W 28/0278* (2013.01); *H04W 48/06* (2013.01); *H04W 48/16* (2013.01); *H04W 72/10* (2013.01); *H04W 72/14* (2013.01); *H04W 74/02* (2013.01); *H04W 74/06* (2013.01); *H04W 74/0808* (2013.01); *H04W 4/70* (2018.02); *H04W 28/0289* (2013.01); *H04W 72/042* (2013.01); *H04W 72/0453* (2013.01)

(58) Field of Classification Search
CPC ......... H04W 28/0268; H04W 28/0278; H04W 28/0289; H04W 48/06; H04W 48/16; H04W 72/10; H04W 72/14; H04W 72/042; H04W 74/0875; H04W 72/0453
See application file for complete search history.

(56) References Cited

U.S. PATENT DOCUMENTS

| | | | |
|---|---|---|---|
| 2010/0075704 A1* | 3/2010 | McHenry | H04W 16/14 455/509 |
| 2010/0097952 A1* | 4/2010 | McHenry | H04L 27/0006 370/252 |
| 2010/0105332 A1* | 4/2010 | McHenry | H04W 16/14 455/62 |
| 2010/0173586 A1* | 7/2010 | McHenry | H04L 27/0006 455/62 |
| 2012/0044816 A1 | 2/2012 | Ratasuk et al. | |
| 2012/0127965 A1* | 5/2012 | Benveniste | H04L 47/14 370/336 |
| 2013/0229995 A1* | 9/2013 | Cai | H04W 72/10 370/329 |
| 2013/0272227 A1* | 10/2013 | Gallagher | H04W 16/02 370/329 |
| 2014/0254502 A1* | 9/2014 | Cai | H04W 48/20 370/329 |
| 2016/0021596 A1* | 1/2016 | Hui | H04W 40/04 370/329 |

OTHER PUBLICATIONS

"5G—Key Component of the Networked Society", RWS-150009, 3GPP RAN Workshop on 5G, Phoenix, Arizona, USA, Sep. 17-18, 2015, pp. 1-55.
"Multiple access for UL small packets transmission", 3GPPTSG RAN WGI Meeting#85, RI-164036, Nanjing, China, May 23-27, 2016, pp. 1-3.
"Overview of MAC grant handling in NR", 3GPP TSG-RAN WG2 #94, Tdoc R2-164026, Nanjing, P.R. China, May 23-27, 2016, pp. 1-4.

* cited by examiner

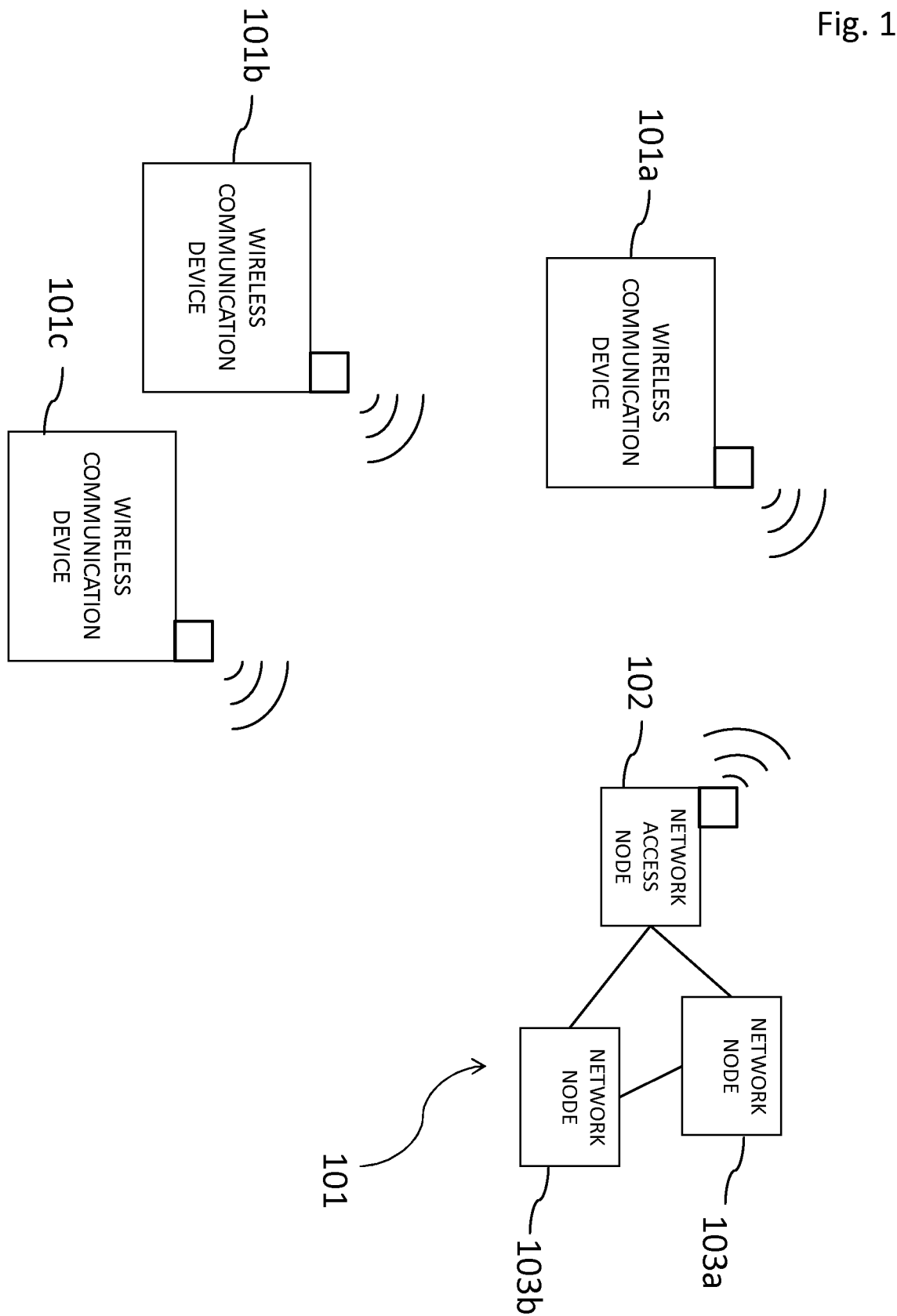

Fig. 4
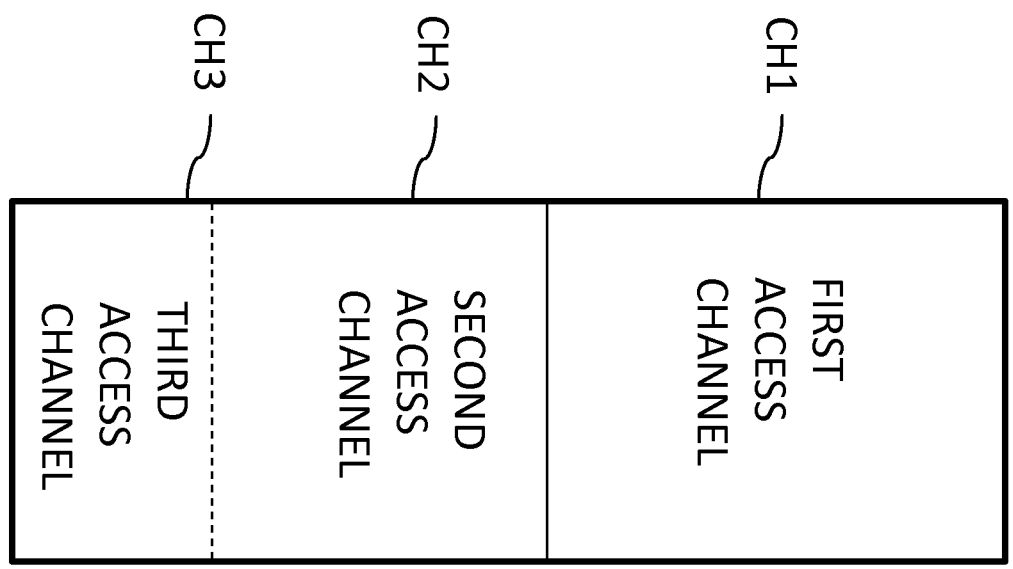
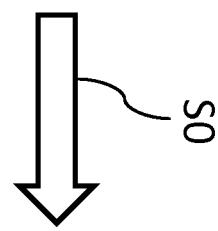
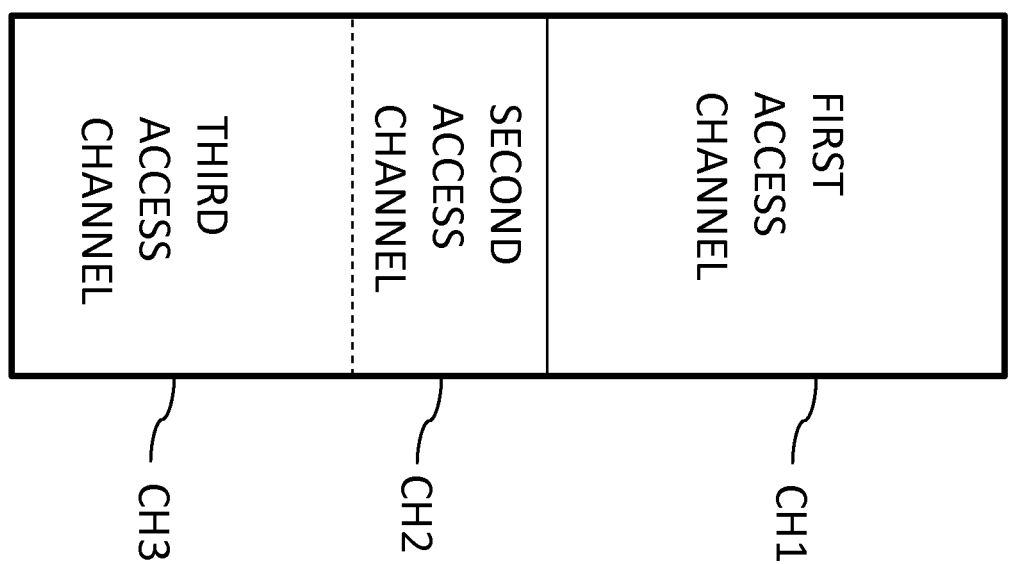

ACCESS CHANNEL MANAGEMENT FOR WIRELESS COMMUNICATION DEVICES

TECHNICAL FIELD

The present disclosure relates to telecommunications and in particular to methods of managing access to a wireless communication network, corresponding computer program products, a wireless communication device, a network access node and a system comprising the latter two.

BACKGROUND

Generally, a wireless communication network can simultaneously support communication for multiple wireless communication devices, also referred to in the state of the art as terminals or as user equipments (UEs). Each wireless communication device communicates with one or more network access nodes, e.g. a base station such as a Node B or an Enhanced Node B (EnodeBs or eNB), via a downlink (from the network access node to the wireless communication device) and/or uplink (from the wireless communication device to the network access node) transmission.

The next generation radio communication system, i.e. the fifth generation (5G), takes it even one step further by connecting all sorts of devices and machines. A wireless communication device may thus for example be an user equipment (UE), a mobile phone, a smartphone, a data modem, a mobile computer, a vehicle, a device of industrial automation, such as a sensor, an actuator or a controller.

One key objective of 5G radio technology is to support highly reliable ultra-low delay machine-type communication (MTC). Thus industrial applications are a typical use cases for wireless communication devices. Wireless communication may be used for remote control of heavy machinery in remote locations or hazardous places; for monitoring and control of smart grids or industrial applications in general.

In order to access a wireless communication network, e.g. via a network access node, an access procedure may be used in a contention-based or a contention-free manner.

In contention-based access, a wireless communication device may select a signature at random, at the risk of "collision" at the network access node if two or more wireless communication devices select the same signature. Contention-free access avoids collision, by informing each wireless communication device which signature it may use. Such access methods are for instance described in international patent application publication WO 2015/071000 A1.

Further on, it has become known from US patent application publication US 2012/0044816 A1 to make use of a contention-based access configuration via physical downlink control channel signaling. Accordingly, configuration data sent to the user equipment devices identifies multiple contention-based access zones, along with minimum power headroom values for each contention-based access zone. A probability factor may also be used to lower collision possibility by influencing whether the user equipments perform contention-based uplink access.

SUMMARY

However, as different classes of (industrial) applications may process data such as sporadic data (e.g. alert messages) and periodic data (e.g. measurement values) with real-time requirements and/or other types of data with non-real-time data requirements (e.g. best-effort data) an improved radio resource management is required. Here the need has arisen to provide extremely fast and reliable connectivity, and thus obtain the functionality needed for these applications. Especially in the case of machine type communication (MTC) a short transmission time interval (TTI), robust transmission, fast channel assignment and in general high availability, energy efficiency and low latency are desirable. For example, a wireless communication system needs to be able to handle e.g. sporadic alarm events with very low latency and very high reliability in the presence of other real time and/or non-real time traffic, as for example mobile broadband. In the case of factory and/or process automation non-real time traffic may consist of software updates, transfer of logs, etc.

According to a first aspect a method of managing access to a wireless communication network is proposed, the method comprising: a wireless communication device selecting an access channel out of a plurality of access channels for transmission of a data packet based on a traffic type out of a plurality of traffic types assigned to the data packet.

According to a second aspect a method of managing access to a wireless communication network is proposed, the method comprising: a network access node providing a plurality of access channels for accessing the network dependent on a traffic type out of a plurality of traffic types assigned to a data packet.

According to a third aspect a method of managing access to a wireless communication network is proposed, the method comprising: a network access node providing a plurality of access channels for accessing the network dependent on a traffic type out of a plurality of traffic types assigned to a data packet, and a wireless communication device selecting an access channel out of the plurality of access channels for transmission of a data packet based on a traffic type out of the plurality of traffic types assigned to the data packet.

According to a fourth aspect a wireless communication device is proposed, said wireless communication device operative to select for accessing a wireless communication network an access channel out of a plurality of access channels for transmission of a data packet based on a traffic type out of a plurality of traffic types assigned to the data packet.

According to a fifth aspect a network access node is proposed, said network access node operative to provide a plurality of access channels for accessing the network dependent on a traffic type out of a plurality of traffic types assigned to a data packet.

According to a sixth aspect a system comprising a wireless communication device according to the fourth aspect and a network access node according to the fifth aspect is proposed.

According to a seventh aspect a computer program product is proposed, said computer program product comprising program code which when executed performs the method steps according to the first aspect.

According to an eighth aspect a computer program product is proposed, said computer program product comprising program code which when executed performs the method steps according to the second aspect.

BRIEF DESCRIPTION OF THE DRAWINGS

FIG. 1 schematically illustrates a wireless communication system comprising several wireless communication devices and a network access node;

FIG. 4 schematically illustrates a redistribution of resources to different access channels;

DETAILED DESCRIPTION

Figure 3:
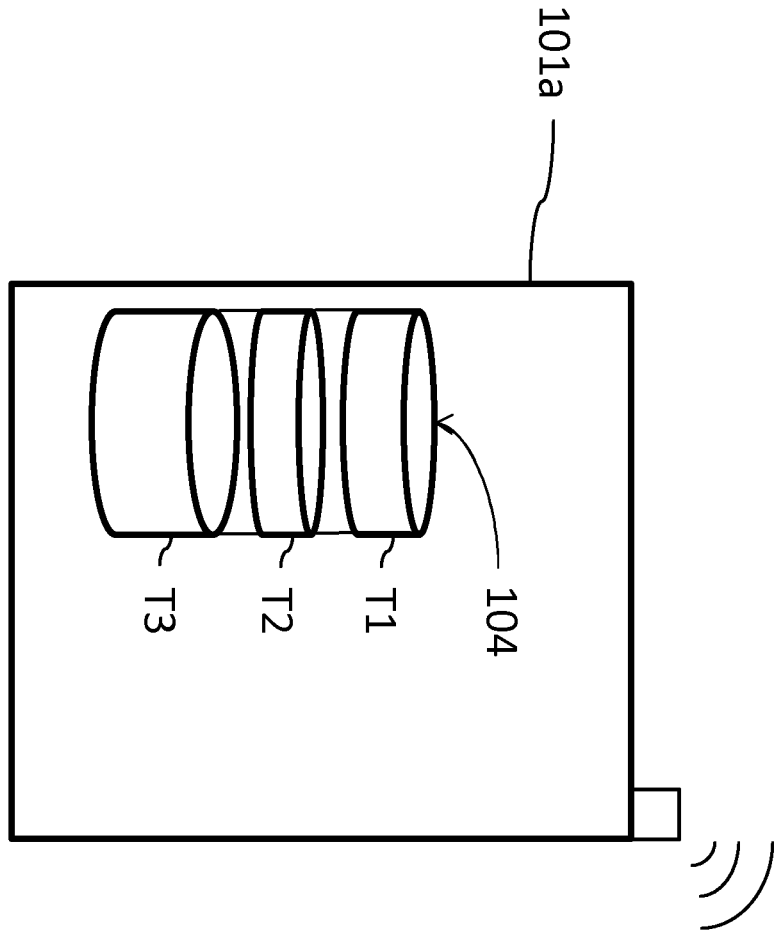
FIG. 3 schematically illustrates a wireless communication device comprising data packets of different traffic types.

The present disclosure generally relates to resource management of a wireless communication network 101 with the participation of one or more wireless communication devices 101a, 101b, 101c. Even though certain aspects may be described with regard to LTE (Long Term Evolution) the embodiments as described herein are applicable to wireless communication networks, such as cellular networks, and wireless communication devices in general. In wireless communication networks, such as a 3GPP (Third Generation Partnership Project) mobile network, various types of wireless communication devices 101a, 101b, 10c may be used. Such a wireless communication device may for example be an user equipment (UE), a mobile phone, a smartphone, a data modem, a mobile computer, a vehicle, a device of industrial automation, such as a sensor, an actuator or a controller.

It should also be understood that the problems and solutions described herein are equally applicable to wireless communication networks and wireless communication devices implementing other access technologies and standards. LTE may be used as an example technology where the embodiments are suitable, and using LTE may therefore be particularly useful for understanding the problem and solutions solving the problem.

The rapid evolution of wireless technologies over the years has changed the way of communication and interaction. The next generation radio communication system, i.e. the fifth generation (5G), will connect not only individuals but also all sorts of devices and machines. One key objective of radio technology hence is to support highly reliable ultra-low delay machine-type communication (MTC), i.e. Critical-MTC. The Critical-MTC concept needs to address the design trade-offs regarding, for instance end-to-end latency, transmission reliability, system capacity and deployment setups, and enables solutions for wireless networks suiting different use cases. Wireless communication systems should in particular carry out radio resource management that allows coexistence among different classes of applications: sporadic data (e.g. alert messages), periodic data, etc. requiring real-time transmission/reception and others with non-real-time data requirements, e.g. simply best-effort data. Alert messages (e.g. alarm notifications) are highly important type of messages for critical applications. Alarms as any other sporadic events are triggered by wireless communication devices (e.g. wireless sensors). Therefore, the wireless communication system needs to be designed in such a way that e.g. sporadic events are transmitted with very low latency and received with very high reliability in the presence of other non-real time traffic. The terms sporadic and event-related are used interchangeably within the present description.

In FIG. 1 a wireless communication system is illustrated. The radio link L1 between the wireless communication devices 101a, 101b, 101c and the wireless communication network 101 is illustrated by nested curved lines. The devices 101a, 101b, 101c are within the coverage of the network 101, e.g. within a cell served by a network access node 102, and associated with that cell or network access node. Even though three wireless communication devices 101a, 101b, 101c are shown there may be more devices present in a certain cell and associated with the network access node.

The wireless communication network 101 comprises a network access node 102 and one or more network nodes 103a, 103b interconnected with each other and the network access node 102. The wireless communication devices 101a, 101b, 101c may establish a radio connection with the network 101 via the network access node 102. That is, each device 101a, 101b, 101c may be assigned time and/or frequency resources for one or more wireless radio communication with the network 101. Thus, the wireless communication device 101a, 101b, 101c may use these resources in order to communicate with the network, i.e. access the network.

When it comes to industrial automation wireless communication technologies like WirelessHART and ISA100.11a come into play which represent two widely used current wireless standards which are based on the IEEE 802.11, IEEE 802.15.1, or IEEE 802.15.4 standards. The MAC (Medium Access Control) layer for both of these standards relies on pre-allocation of resources (i.e., time slots and frequency resources) in order to achieve the desired traffic latency requirements. Such a communication however is static and needs to be preconfigured. Since the occurrence of sporadic real-time traffic (e.g. alarms) may be rare, schemes based on pre-allocation of resources (i.e. time slots and frequency resource) are not considered to be very efficient from the resource utilization point of view.

In order to increase the resource utilization and avoid over-provisioned resources a contention-based medium access scheme, e.g. the Carrier Sense Multiple Access/Collision Avoidance (CSMA/CA) principle, for transmissions of sporadic data may be employed. In typical industrial applications, in addition to sporadic real-time traffic, other traffic types such as best effort or broadband traffic also need to be supported. Furthermore, the traffic in industrial applications, such as process automation or factory automation, may include both real-time and non-real-time periodic traffic, e.g. periodic transmissions of keep-alive signals from automation parts (such as from sensors, actuators, etc.) and status update messages. Therefore, relying on a single specific medium access scheme (pre-allocated or contention-based) for significantly different kinds of traffic is inefficient and often results in failure to meet the desired QoS (Quality of Service) requirements. Hence, an efficient access scheme, e.g. implemented in a MAC layer, needs to be designed which allows real-time traffic to co-exist efficiently with the other types of traffic.

For example multiple access channels may be defined comprising different time and/or frequency resources. In particular a first set of time and/or frequency resources, also denoted as area, may form a first access channel. Transmission of data via such an access channel may be performed in different manners, e.g. according to an uplink or downlink grant from the network access node pre-allocating resources for a particular wireless communication device or in a contention based manner, according to which any wireless communication device associated with a cell or a network access node may make use of the same resources. Notably, a plurality of access channels with different or the same access schemes may exist. Thus, different areas (comprising different time and/or frequency resources) of the radio spectrum available may be defined via which data packet transmission may be carried out according to different access schemes.

Figure 2:
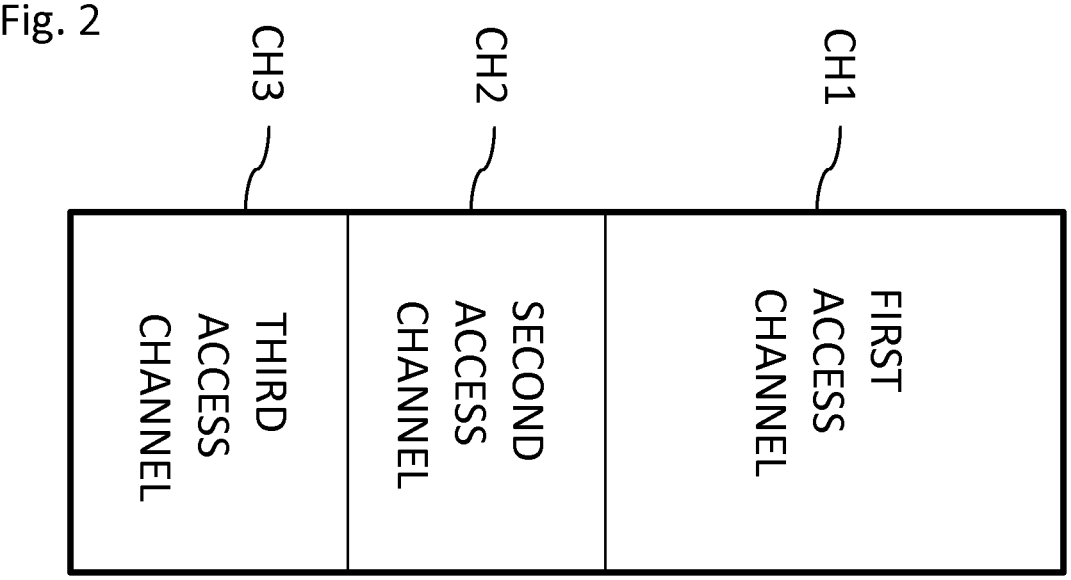
FIG. 2 schematically illustrates a plurality of access channels.

In FIG. 2 a plurality of access channels CH1, CH2, CH3 is illustrated. A wireless communication device, e.g. device 101a, may select one of those access channels CH1, CH2, CH3 in order to transmit one or more data packets. However, also only two or more than three access channels may be available in order to transmit and/or receive data packets, respectively.

For example, access to the network 101 via the transmission medium may be provided in a contention based manner, e.g. using the CSMA/CA (Carrier Sense Multiple Access/Collision Avoidance) principle, via the third access channel CH3. Access to the network 101 via the second access channel CH2 can be provided by pre-allocating resources to a certain device 101a, 101b, 101c for transmission of one or more data packets, whereas access to the network via the first access channel CH1 can also be provided in a contention based manner or by pre-allocating resources. For example, the resources of the first access channels CH1 can be (pre-)allocated in a static manner, e.g. resources are only accessible for one wireless communication device, whereas the resources of the second access channel CH2 may be dynamically (pre-)allocated, e.g. the resources may be shared between multiple wireless communication devices and upon request allocated for one of said multiple wireless communication devices.

Thereby the QoS requirements of real-time sporadic traffic may be complied with in addition to its efficient co-existence with other traffic types.

The access channel CH3, may be defined to handle sporadic (event-related) traffic according to a contention-based access scheme. This contention-based access channel (CBACH) may be (re-)configured based on the perceived contention level in the wireless communication system. That is to say, resources may be (re-)assigned to different access channels with the constraint of also allowing for other traffic types to be transmitted via access channels dedicated to said other traffic types. In an embodiment the CBACH may also or exclusively be used to reserve resources for sporadic data transmission. This may be the case if the data to be transmitted is large enough to occupy the CBACH for a very long time, e.g. above a certain threshold, and make it unavailable for other real-time traffic.

In case of small data packets such as alarms, these may be transmitted directly over the CBACH. These mechanism allow flexible time and/or frequency resource allocation for CBACH based on the perceived contention level (which can e.g. be determined based on the number of wireless communication devices, their traffic loads, statistics on retransmission counts, number of collisions/failures, etc.).

In another embodiment two efficient contention resolution schemes are proposed in order to meet the QoS requirements of sporadic data transmissions. Firstly, the adaptive approach where the time and/or frequency resources for CBACH are adjusted appropriately such that the probability of collisions for future channel access is reduced or minimized; and secondly a polling scheme where after the transmission characteristics have shown severe degradation, the wireless communication 101a, 101b, 101c are polled by the network access node 102 sequentially or based on a prioritization scheme.

Figure 9:
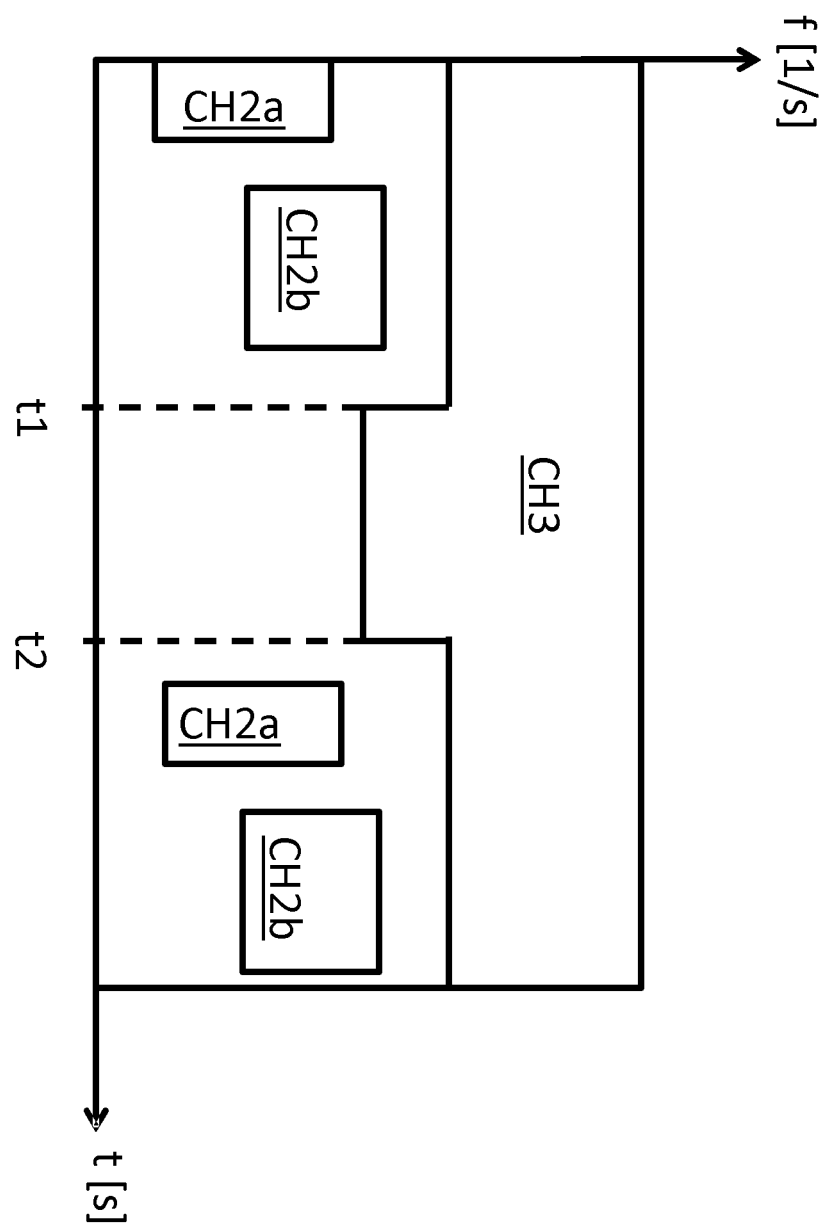
FIG. 9 schematically illustrates a distribution of resources of the second and third access channel as a function of time and frequency.
Figure 10:
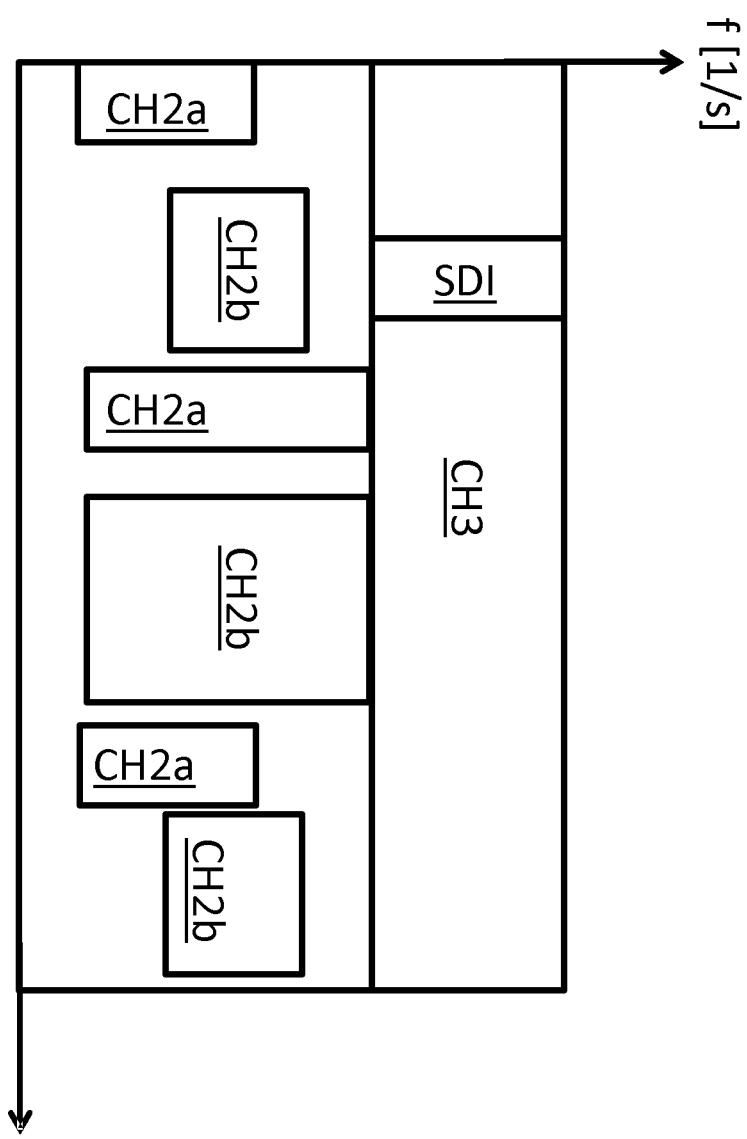
FIG. 10 schematically illustrates a distribution of resources of the second and third access channel as a function of time and frequency.

Hence, the embodiments proposed herein allow handling of real-time sporadic traffic in addition to legacy mobile broadband traffic, any other occasional non-real time such as configuration/software updates, and/or real-time and non-real-time periodic traffic. For periodic real time traffic, pre-allocated resources (i.e. time slots and frequency resource) are preferred since the network access node 102 is able to determine information about the traffic itself such as inter-arrival time of data packets, packet size, etc. On the other hand, for the inherent event-based nature of mobile broadband traffic, dynamic scheduling, i.e. providing an uplink grant, as used today in LTE is the preferred choice. In FIGS. 4, 9 and 10 the bandwidth adaptation of access channels is described in more detail.

Hence, according to an embodiment a method of managing access to a wireless communication network 101 is proposed, the method comprising: a wireless communication device 101a, 101b, 101c selecting S2 an access channel out of a plurality of access channels CH1, CH2, CH3 for transmission of a data packet T1, T2, T3 based on a selected traffic type from a plurality of traffic types, wherein the selected traffic type is assigned to the data packet. Assigning the traffic type to the one or more data packets and/or selection of the traffic type from the plurality of traffic types may be performed by the wireless communication device. Thus, firstly a traffic type out of said plurality of traffic types may be selected, e.g. based on the content of the data or the data packet to be transmitted. The traffic type selected may be assigned to the one or more data packets. Based on the traffic type an access channel is selected.

In FIG. 3 a wireless communication device 101a comprising data packets of different traffic types T1, T2, T3 is depicted. The data packets T1, T2, T3 may be stored in a memory or database 104 in the wireless communication device 101a. For example a first traffic type may be dedicate for one or more data packets T1 to be transmitted periodically and/or in real-time. For example one or more measurement values may have to be transmitted from the wireless communication device 101a periodically and/or in real-time and thus may be assigned the first traffic type. A second traffic type may be dedicated for one or more packets T2 to be transmitted according to non-real-time conditions. For example one or more parameters or a configuration of the wireless communication device may have to be transmitted from the wireless communication device 101a according to non-real-time conditions and thus may be assigned the second traffic type. A third traffic type may be dedicated for one or more packets T3 to be transmitted event-related and/or in real-time. For example one or more alarms, e.g. indicating an abnormal state, may have to be transmitted event-related and/or in real-time and thus be assigned a third traffic type.

The traffic type may be dependent on the content of the data or data packet to be transmitted. In order words, the traffic type is determined or assigned based on the (informational) content of a data packet. According to the traffic type assigned or determined an access channel is selected from the plurality of the access channels present, e.g. any one of the access channels CH1, CH2, CH3 in FIG. 2. In case of a data packet of the first traffic type T1 the first access channel CH1 is selected, in case of a data packet of the second traffic type T2 the second access channel CH2 is selected, and in case of a data packet of the third traffic type T3 the third access channel CH3 is selected. Assignment or determination of a traffic type can e.g. be based on the content of one or more data packets. Also, assignment may be made by way of an implicit or explicit indicator. For example an explicit indicator can be added to the data packet.

In FIG. 4 a redistribution of the resources assigned to the different access channels CH1, CH2, CH3 as shown in FIG. 2 is illustrated. The configuration of the access channels CH1, CH2, CH3 can for instance be an initial configuration communicated to the wireless communication device 101a or stored within the wireless communication device, e.g. as a default configuration. During operation of the wireless communication device 101a the need may arise to redistribute the partitioning of the resources used for the access channels CH1, CH2, CH3 and thus the access schemes employed to different areas of the bandwidth.

With regard to the example provided in FIG. 4 the first area of time and/or frequency resources which forms the first access channel CH1 stays the same, whereas the resources of the second and the third access channel CH2, CH3 are re-allocated. Here, the third area is increased by reallocating resources previously part of the second area to the third area. Consequently the second area is decreased. The re-distribution is performed in a step S0 as depicted in FIG. 4. The re-distribution may be performed (by the network access node) according to an indication obtained by the wireless communication device, e.g. from the network access node (provided that resources for a (re-)distribution are available). Subsequently the new distribution may be communicated to the one or more wireless communication devices associated with the network access node 102 or a cell served by said network access node 102.

Figure 5:
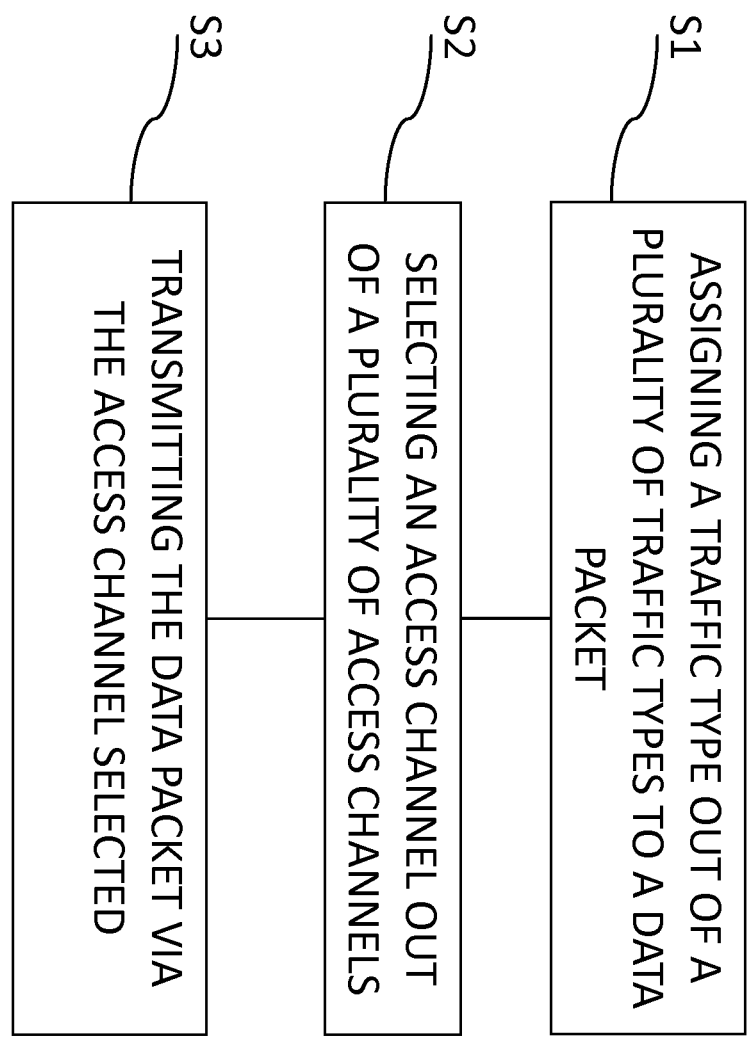
FIG. 5 shows a flowchart illustration of a first embodiment of access management for a wireless communication device.

FIG. 5 shows a flowchart of an exemplary embodiment comprising steps S1 to S3 which may be performed by a wireless communication device 101a. In a first step S1 a traffic type out of a plurality of traffic types is assigned to a data packet. The situation may occur that the data packet already has been assigned a traffic type, e.g. because they have been pre-processed by another unit or device which generated the data packet or the content thereof in the first place. Based on the traffic type an access channel is selected in a step S2 for transmission of the one or more data packets. The data packets are thus assigned to an access channel based on the traffic type.

The traffic type may be for instance determined based on the content of the data packet. One or more additional criteria can be taken into account when determining the traffic type. Subsequently the one or more data packets are transmitted in a step S3 via the access channel selected. By way of selecting the access channel the manner or the scheme according to which the data packets are transmitted is determined.

Preferably said plurality of traffic types comprises at least a first, a second and a third traffic type, wherein said first traffic type is dedicated to data packets to be transmitted periodically and/or in real-time, and wherein said second traffic type is dedicated to data packets to be transmitted according to non-real-time conditions, and wherein said third traffic type is dedicated data packets to be transmitted event-related and/or in real-time.

The wireless communication device may subsequently select a first access channel from said plurality of access channels for a data packet of the first traffic type, said first access channel comprises a first area of time and/or frequency resources, a second access channel from the plurality of access channels for the data packet of the second traffic type, said second access channel comprising a second area of time and/or frequency resources, or a third access channel from the plurality of access channels for a data packet of the third traffic type, said third access channel comprising a third area of time and/or frequency resources. The resources of an area may be contiguous or scattered within the available transmission bandwidth, e.g. the system bandwidth.

The wireless communication device may obtain an indication indicating a distribution of time and/or frequency resources reserved for the first, second and/or third access channel. Said indication may be received by the wireless communication device from a network access node, e.g. because the systems load has changed or the wireless communication device has been handed over to another network access node.

The distribution of time and/or frequency resources reserved for the first, second and/or third access channel may be based on a quality of service metric. Such a metric is usually used to estimate the link quality with the network access node. The metric may also be used to predict whether sufficient available bandwidth exists. The bandwidth encompasses frequency resources. In particular the total area of time and/or frequency resources encompassed by the first, second and third area of different distributions of the first, second, and third area remains constant. In order words, the total area of time and/or frequency resource may be repartitioned. The total area of time and/or frequency resources may correspond to a system bandwidth. The distribution of the first, second and/or third area within the total area may be configured dependent on an application requirement.

The quality of service metric may be based on at least one of the following: a buffer status of a data buffer of the wireless communication device containing data to be transmitted in one or more data packets, a priority level assigned, e.g. by the wireless communication device, to said data packet, a contention level for the time and/or frequency resources being assigned to the third access channel, e.g. according to the number of wireless devices with third traffic type, an availability of time and/or frequency resources for the third access channel within a system bandwidth.

The wireless communication device may transmit said data packet in a contention based manner in case the third access channel is selected in. The wireless communication device may transmit said data packet according to a scheduling grant in case the second access channel is selected. The wireless communication device may transmit, preferably via the third access channel, an indication containing information required to adapt the second and/or third access channel and/or to schedule data of the third traffic type. The wireless communication device may assign data to data packets of the third traffic type and transmit said data packets via the third access channel, in case the amount of data is below a configurable threshold of the quality of service metric, and/or the wireless communication device may transmit data in data packets of the third traffic type via the second access channel, in case the amount of data exceeds a configurable threshold of the quality of service metric.

Further on, the wireless communication device may obtain an indicating whether a data packet is to be transmitted via the second and/or third access channel. The wireless communication device may receive a poll message in case the contention level on the third access channel exceeds a safeguard threshold of the quality of service metric. The wireless communication device may select an access channel out of the plurality of access channels, based on a group out of a plurality of groups of wireless communication devices the wireless communication device is assigned to. The wireless communication device may obtain an indication indicating time and/or frequency resources of one or more access channels for accessing the network.

Figure 6:
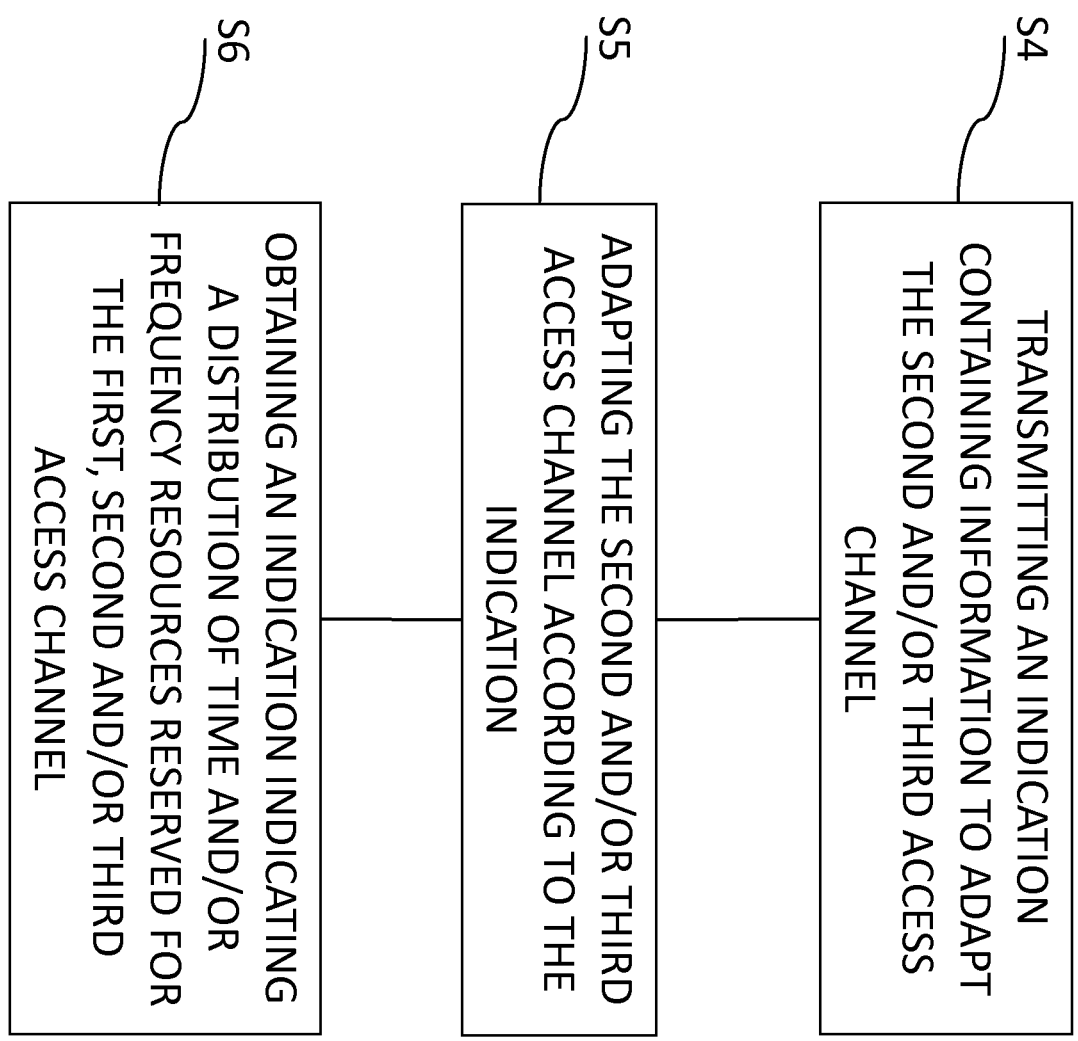
FIG. 6 shows a flowchart illustration of a second embodiment of access management for a wireless communication device.

FIG. 6 shows a flowchart of another exemplary embodiment comprising steps S4 to S6 which may be performed by the wireless communication device 101a and/or a network access node respectively. The wireless communication device 101a may in order to reliably transmit, e.g. according to a threshold of quality of service required, initiate a redistribution of access channels. For this purpose the wireless communication device may transmit in a step S4 an indication containing information to adapt one or more access channels, e.g. the second and third access channel. This indication may for example contain information or be indicative about the size of a data packet to be transmitted. Thereupon the network access node may adapt in a step S5 the access channels based on the indication received. Additionally the indication may be processed and a preferred distribution of time and/or frequency resources may be assigned to the respective access channels. The wireless communication device can be informed about the (re-) distribution of the time and/or frequency resources for the access channels by the network access node 102 by way of an indication indicating to the wireless communication device the new distribution of time and/or frequency resources. This indication may thus be obtained by the wireless communication device 101a in a step S6.

Figure 7:
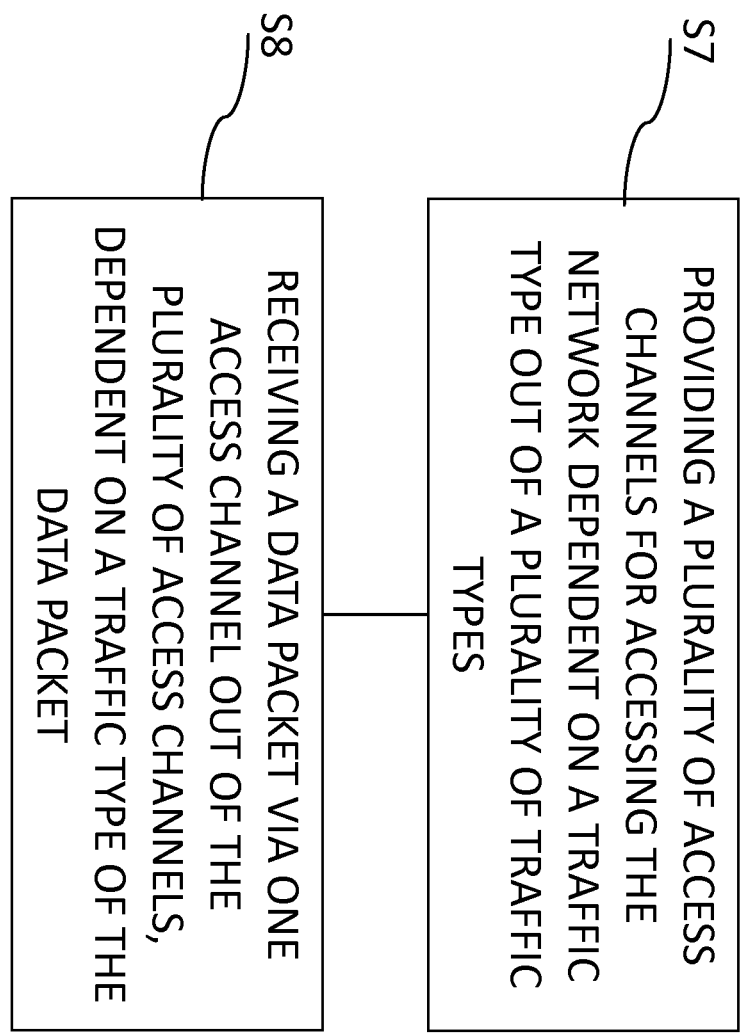
FIG. 7 shows a flowchart illustration of a third embodiment of access management for a wireless communication device.

FIG. 7 shows a flowchart of another exemplary embodiment comprising steps S7 and S8 which may be performed by a network access node 102. In order to access the wireless communication network a plurality of access channels is provided by the network access node in a step S7. The access channels differ from each other in that different traffic types and/or access scheme are employed for accessing the network via the respective access channels. The access channels may be coordinated by the network access node. Although the network access node is depicted e.g. in FIG. 1 as one device its functionalities, e.g. the method steps described, may be embedded in that device but can also be distributed between different devices. Thus the access channels are provided for transmitting/receiving one or more data packets of different traffic types wherein an access channel for one or more data packets is selected based on the traffic type of the data packet.

Thus in a step S8 the network access node receives one or more data packets of a first traffic type via a first one of the access channels whereas one or more data packets of a second traffic type are received by the network access node via a second one of the access channels provided.

Figure 8:
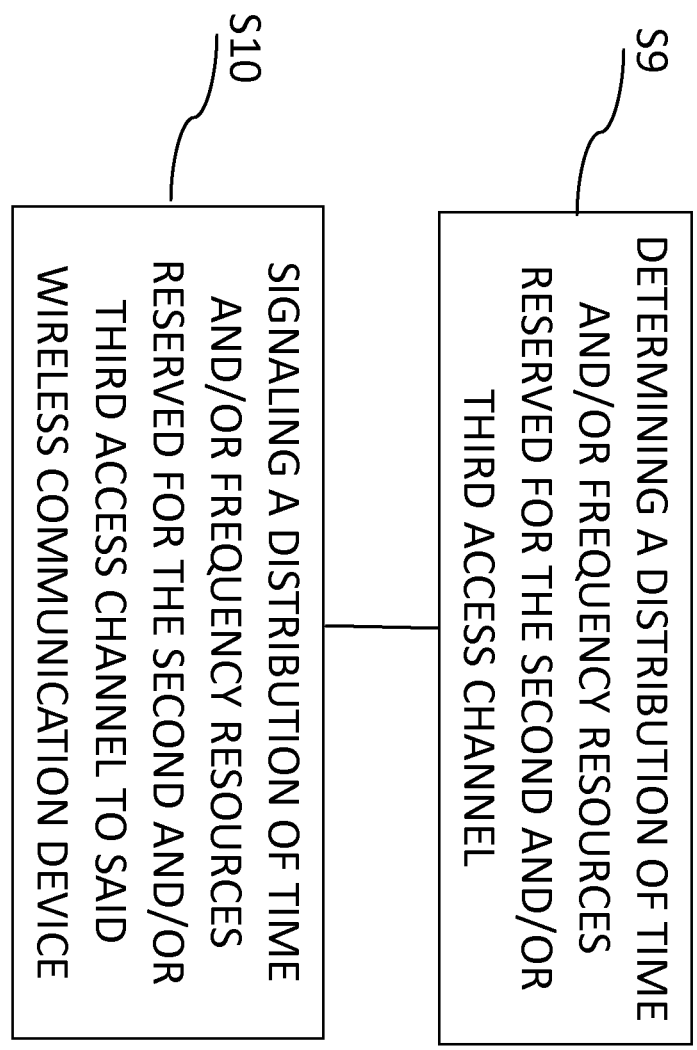
FIG. 8 shows a flowchart illustration of a fourth embodiment of access management for a wireless communication device.

FIG. 8 shows a flowchart of another exemplary embodiment comprising steps S7 and S8 which may be performed by a network access node 102. In a step S9 the network access node 102 may determine a distribution of time and/or frequency resources reserved for the access channels provided, e.g. the second and/or third access channel. Step S9 may be performed during initialization of the network access node and/or the wireless communication system or during operation of the network access node, e.g. due to a changed system load, i.e. a changed number of devices or types or devices present, e.g. in the area covered by the network access node. In a subsequent step S10 a distribution is signaled to one or more wireless communication devices. This distribution may be the one determined in step S9 or may be obtained from another network node or retrieved from a memory operatively connected to the network access node. The distribution may comprise information about the time and/or frequency resources reserved for the respective access channels, e.g. the first, second and/or third access channel.

In a further embodiment, a method for supporting real-time traffic in addition to non-real-time traffic and other periodic traffic through contention based channel access is proposed. The method allows for efficient contention resolution in the network access node and may comprise the following step: —configuring a CBACH based on latency requirements, perceived contention levels and/or reliability statistics; —performing energy/power/activity detection in the transmission medium, e.g. contention level monitoring; —performing efficient contention resolution mechanisms, e.g. adaptive CBACH, based on the traffic load and/or priority levels and/or triggering of polling mechanism; —performing reallocation of resources in case of readjustment CBACH time and/or frequency resources based on perceived contention level. The step of configuring may be performed in order to make sure that the CBACH is available for sporadic real-time traffic, e.g. for critical applications in which one or more wireless communication devices are employed In a further embodiment, a method for sporadic real-time traffic transmission (to the network access node) by a the wireless communication device, e.g. a sensor or actuator or controller, is proposed, comprising of the following steps: —receiving a CBACH configuration from the network access node 102, e.g. initially and/or during operation of the wireless communication device; —performing channel sensing on CBACH; —sending SDI (Sporadic Data Indicator) in case of large sporadic data or send the short sporadic data directly over CBACH. The method may further comprise sending retransmission statistics to the network access node at run time. Further on, grouping of wireless communication device may be performed to further reduce collision probability and/or different priority levels are defined for different wireless communication devices are assigned based on QoS requirements.

The network access node may receive, dependent on a traffic type out of a plurality of traffic types assigned to the data packet, the data packet via one access channel out of the plurality of access channels. The plurality of traffic types may comprise at least a first, a second and a third traffic type, wherein said first traffic type is dedicated to data packets to be transmitted periodically and/or in real-time, said second traffic type is dedicated to data packets to be transmitted according to non-real-time conditions, said third traffic type is dedicated data packets to be transmitted event-related and/or in real-time. The network access node may provide a first access channel, said first access channel comprising a first area of time and/or frequency resources, for the first traffic type, the network access node may provide a second access channel, said second access channel comprising a second area of time and/or frequency resources for the second traffic type, and/or the network access node may provide a third access channel, said third access channel comprising a third area of time and/or frequency resources, for the third traffic type.

The network access node may adapt the second and/or the third area of time and/or frequency resource based on a quality of service metric. The total area of time and/or frequency resources covered by the first, second and third area may remain constant. The distribution of the first, second and/or third area within the total area may be configured dependent on an application requirement. The total area may correspond to the system bandwidth.

The quality of service metric may be based on at least one of the following: a buffer status of a data buffer containing data to be transmitted in one or more data packets, a priority level assigned to said data packet, a contention level for the time frequency resources being assigned to the third access channel, e.g. according to the number of wireless devices with the third traffic type, availability of time and/or frequency resources for the third access channel within a system bandwidth. The network access node may receive said data packet via the third access channel in case the third traffic type is assigned to the data packet. The network access node may arrange the third access channel for a network access in a contention based manner. The network access node may arrange the third access channel for a network access based on a carrier sense multiple access scheme. The access scheme may include a scheme for identifying an unsuccessful transmission and/or a scheme for collision avoidance and/or collision detection. The network access node may arrange the second access channel for a network access according to a scheduling grant. The network access node may signal a distribution of time and/or frequency resources reserved for the second and/or third access channel to said wireless communication device, after adjusting the second and/or third area.

The network access node may receive, preferably via the third access channel, an indication (SDI) indicating the information required to schedule the third traffic type, e.g. the amount of data to be transmitted by one or more data packets and/or the priority level. The network access node may receive one or more data packets via the third access channel, in case the amount of data of the one or more data packets is below a configurable threshold of the quality of service metric, the network access node may receive one or more data packets via the second access channel, in case the amount of data of the one or more data packets exceeds a configurable threshold of the quality of service metric. The network access node may indicate to the wireless communication device whether the data is to be transmitted via the second and/or third access channel. The network access node may initiate a polling routine for polling wireless communication devices assigned to the network access node in case the contention level on the third access channel and/or the if communication reliability exceeds a safeguard threshold of the quality of service metric. The network access node may assign a first group of wireless communication devices associated with the network access node to one of the plurality of access channels and the network node may assign a second group of wireless communication devices associated with the network access node to another one of the plurality of access channels.

According to another embodiment of managing access to a wireless communication network, a method may comprise a network access node providing a plurality of access channels for accessing the network dependent on a traffic type out of a plurality of traffic types assigned to a data packet, and a wireless communication device selecting an access channel out of the plurality of access channels for transmission of a data packet based on a traffic type out of the plurality of traffic types assigned to the data packet.

FIG. 9 presents the overall system bandwidth in terms of frequency where a part of the frequencies available are allocated to an access channel CH3 dedicated for contention based access, whereas another part of the frequencies available are allocated an access channel CH2a and CH2b dedicated to access based on scheduling grants. Thereby transmission of sporadic real-time traffic and non-real-time traffic as well as periodic real-time traffic is supported. The network access node as a central coordinator aims at making sure that a contention-based access channel (CBACH) is available to one or more wireless communication devices, e.g. for critical applications, for transmission of real-time data. The information about the channel resources for CBACH is signaled to the devices during the initial configuration. The allocation of time/frequency resources for CBACH is (re-)configured at a first point in time t1, e.g. based on the perceived contention level and the most stringent real time requirement, and again at a point in time t2.

In a further embodiment, instead of having a single dedicated access channel in a specific frequency range, the CBACH can be scattered across multiple resources in the frequency domain. This also allows dealing with fading effects. However, a minimal set of channel resources to achieve the QoS requirements is always ensured for CBACH based on the perceived contention-level in the system. A certain bandwidth may be reserved all the time (i.e. dedicated frequency channel) for each of the access channels, e.g. for the third access channel CH3.

In a further embodiment, the allocated channel resources for third access channel can also be made adaptive if there is a possibility to utilize the overall system bandwidth and make it available for contending sporadic real-time traffic. The higher the number of available channel resources for contention is, the lower will be the probability of collision. Therefore, the network access node may adjust the CBACH resources based on the perceived contention levels and reliability metrics. The network access node may also take away the channel resources from other non-real-time devices if it is necessary to achieve the desired margin for real-time QoS. Hence, adaptation of channel resources as CBACH might require reallocation of resources to other devices with non-real-time traffic. For instance, based on the contention level on CBACH, if the network access node determines to allocate more resources to meet the QoS requirements, it will take away the resources from non-real time devices and designate them as contention resources (e.g. CBACH) e.g. of the third access channel. The new allocation information may subsequently be signaled to all the relevant devices, for example Critical-MTC devices. However, the reverse situation may occur in which resources from the third access channel are assigned to the second access channel.

FIG. 10 another embodiment of the adaption of the bandwidth is illustrated. For example in a case of an alarm signal with large payload size (e.g., when additional characteristics related to alarm need to be transmitted to the controller), an indication, namely a sporadic data indicator (SDI), including information about the size of the available sporadic data is send to the network access node. This indication is transmitted on the third access channel, using e.g. the CSMA/CA principle, also denoted as contention-based access channel (CBACH). The decision whether to send sporadic real-time data over the third access channel CH3 or not, is made based on the size of the sporadic data and the perceived contention level on third access channel. The information about the size of sporadic data which could be transmitted directly on CBACH is either pre-configured or provided to all the devices by the network access node during operation. The selection of directly transmittable sporadic data size on CBACH is done based on the channel resources allocated to CBACH, number of devices associated to the network access node and the most stringent latency requirement, etc. Therefore, any short real-time data such as short emergency alarms (i.e., without additional characteristics about the alarm or meta-data) are transmitted directly on CBACH (if the bandwidth allocated to it can fulfill the most stringent latency requirements).

On receiving an indication, e.g. in the form of an SDI, for large data transmissions from a wireless communication device, the network access node may send a scheduling grant (SG) and allocates certain channel resources to the wireless communication device sending the SDI. The SG is sent by the network access node using the short payload channels CH2a or similar downlink control channels. The SG contains resource allocation information for the device which may then transmit data using the long payload channel CH2b or similar data channels. For example the access channel CH2a may be reserved for use by a first group of wireless communication devices whereas the access channel CH2b may be reserved for use by a second group of wireless communication devices.

According to a further embodiment a contention-based channel access method for efficiently prioritizing sporadic real-time traffic in systems where non-real-time traffic also coexists is proposed. Furthermore, the present disclosure allows meeting QoS requirements for sporadic real-time traffic by providing efficient contention resolution mechanisms by firstly adapting the bandwidth for contention channel and subsequently triggering of a polling mechanism. These efficient contention resolution mechanisms substantially minimize the collision probability for future transmissions and improve reliability for data transmission.

Accordingly, the embodiments proposed herein allow an efficient coexistence of various traffic types and for the respective QoS requirements to be met: The time and/or frequency resources of the system bandwidth or part thereof may be reserved for any one of the access channels set up. For example, pre-allocation of resources for periodic real time traffic, dynamic allocation of resources for best effort traffic and CSMA (Carrier Sense Multiple Access) based contention region for sporadic real time traffic may be arranged. The real time sporadic traffic may directly use the CBACH. As the real time sporadic traffic can be of different sizes, the size of a packet may be configured based on CBACH channel partitioning and bandwidth available. This configuration may be carried out by a network node and may be conveyed to another network node. This allows for a high flexibility with regard to the allocation of resources and dynamic reconfiguration of resources. The redistribution can be dynamic on a single TTI (Transmission Time Interval) level or plurality of TTIs. In case a reallocation of time and/or frequency resources, e.g. of PRBs (Physical Resource Blocks), is performed, a new CBACH configuration is broadcasted to all wireless communication devices associated with the network access node. A certain maximum degree of contention in the CBACH channel may be maintained, e.g. by way of a configurable threshold of a quality of service metric, and beyond that a reallocation of resources may be triggered. The reallocation of resources may be triggered based on a combination of multiple factors as for example the following: a data size (buffer status), a priority level, a contention level in the medium, availability of resources, and a fusion of any one of those to trigger decisions for (re)-configuration of resources for contention based, scheduling based and/or polling based access. For example, when the contention level grows, resources from low-priority traffic may be reassigned. In such a case the network access node may make sure that there is a certain minimum CBACH bandwidth available for real time traffic. Beyond that minimum bandwidth of the CBACH the network access node can additionally use radio resources (time/frequency) in a dynamic fashion. The wireless communication device may thus determine whether to send a SDI or the data itself according to received information about configuration. The configuration could be adapted at runtime by the network access node.

Furthermore, a polling mechanism may be initiated if not enough bandwidth, e.g. in the form of PRBs, for the CBACH are available. Such an initiation may be based on a statistical analysis when triggering polling is more beneficial (e.g. in scenarios with high realtime periodic traffic load) than an attempt to transmit data packets via the CBACH. The polling mechanism may involve only wireless communication devices which send data with high priority. A list of such wireless communication devices may be stored in a memory or database operatively couple to the network access node.

If the network access node determines that the current configuration is unable to meet the QoS requirements, it may either adjust the number of channel resources allocated to CBACH as depicted in FIGS. 4 and 9 or trigger the polling mechanism for at least a subset of the wireless communication devices. The decision to trigger any of the two alternatives may be based on the degradation in reliability characteristics. These may include for instance unsuccessful transmission (using radio frequency (RF) energy detection algorithms or some other statistical metrics), lower link quality statistics (such as Proportional Rate Reduction (PRR), retransmissions), determined contention level with increasing number of wireless communication devices and traffic loads.

Once the link reliability is assessed to be degraded, e.g. due to collisions, the network access node may make more channel resources available for contention, which in turn reduces the collision probability. The polling mechanism exploits the use of network access node as a central coordinator to trigger polling mechanism for all the wireless communication devices associated with that network access node. The polling mechanism allows for deterministic channel access delay. Regarding the polling mechanism, the network access node will poll all the wireless communication devices associated to it and if any wireless communication device has some real-time traffic to transmit, this real time traffic can be transmitted in the allocated resources. The polling mechanism can also be seen as the fall back strategy and will only be triggered when there is not enough contention resources available or traffic load becomes too high to meet the QoS requirements of real time traffic.

In one embodiment, the re-allocation of resources is performed by the network access node. If the network access node detects the need for more resources for contention, it takes away the resources from the devices with non-real-time traffic and designate as CBACH. This new configuration may be signaled to all the wireless communication devices, or a subset of the wireless communication devices, e.g. a subgroup of devices, so that they have an updated knowledge about the CBACH.

According to a further embodiment grouping of wireless communication devices to one of the available access channels may be performed according to their geographical location, functional basis or data centric characteristics. The grouping implicitly reduces the number of contenders and therefore helps in significantly reducing the collision probability on CBACH. After grouping devices adequately, separate CBACHs can be allocated for each group of Critical-MTC devices. Alternatively, time blocking using the same bandwidth could also be exercised to give exclusive access right through a reservation signal. Moreover, if a collision is detected on a particular CBACH due to contending members of a group, contention resolution is performed only for the corresponding group on this CBACH by (i) either triggering a polling mechanism for wireless communication devices belonging to that particular group or (ii) by increasing the contention bandwidth allocated to it for next retransmission of an indication like a SDI or short alarm signals.

In yet another embodiment, priority levels could be defined within the groups based on wireless communication device characteristics and QoS requirements. Furthermore, for different "groups", the priority levels could also be different. Therefore, the contention parameters are selected according to priority levels.

Figure 11:
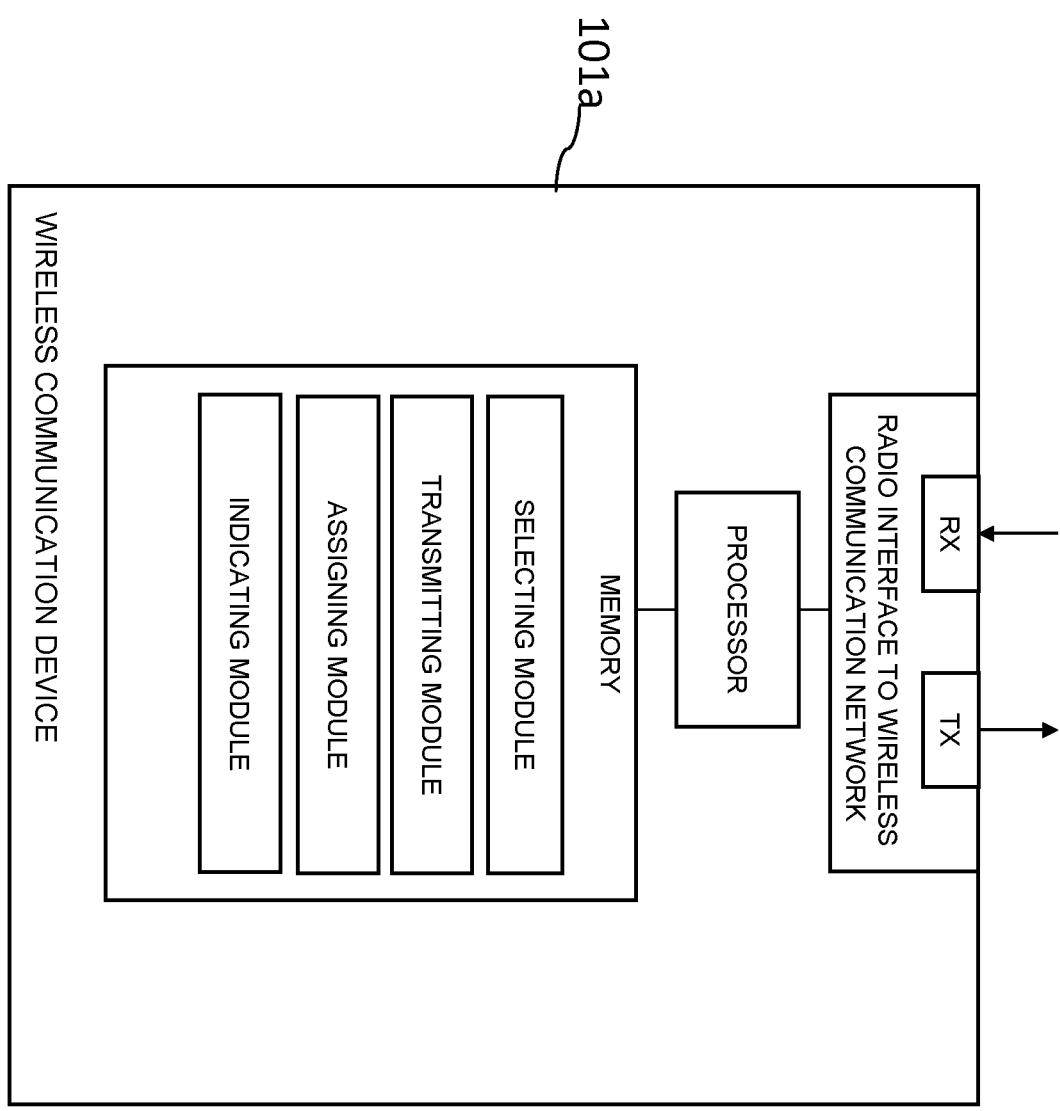
FIG. 11 schematically illustrates exemplary structures for implementing the above-described concepts in a wireless communication device.

Now referring to FIG. 11, exemplary structures for implementing the above-described concepts in a wireless communication device are schematically illustrated.

In the illustrated structure, the wireless communication device 101a includes a radio interface for performing data transmission to or from the wireless communication network 101. It is to be understood that for implementing transmitter (TX) functionalities the radio interface includes one or more transmitters, and that for implementing receiver functionalities (RX) functionalities the radio interface may include one or more receivers.

Further, the first wireless communication device 101a includes a processor coupled to the radio interface to the wireless communication network and a memory coupled to the processor. The memory may include a ROM, e.g., a flash ROM, a RAM, e.g. a DRAM or SRAM, a mass storage, e.g., a hard disk or solid state disk, or the like. The memory includes suitably configured program code to be executed by the processor so as to implement the above-described functionalities of the wireless communication device. More specifically, the memory may include a module for accomplishing provision of selecting an access channel out of the plurality of access channels, a module for accomplishing provision of transmitting a data packet via the access channel selected, a module for accomplishing provision of assigning a traffic type out of a plurality of traffic types to a data packet and/or a module for accomplishing provision of indicating information to adapt an access channel. Further, the memory may also include a generation module for generating said message in the first place or an input for receiving data or data packets from another unit or device.

It is to be understood that the structure as illustrated in FIG. 7 is merely schematic and that the wireless communication device 101a may actually include further components which, for the sake of clarity, have not been illustrated, e.g. further interfaces or additional processors. Also, it is to be understood that the memory may include further types of program code modules, which have not been illustrated. The memory and/or the processor can also be implemented by way of a field-programmable gate array (FPGA). For example, the memory may include program code modules for implementing typical functionalities of a wireless communication device or program code of one or more applications to be executed by the processor. According to some embodiments, also a computer program product may be provided for implementing concepts according to embodiments disclosed herein, e.g., a computer-readable medium storing the program code and/or other data to be stored in the memory.

The wireless communication device 101a may further comprise one or modules, e.g. in said memory, for carrying out any one of the embodiments and/or method steps as described with regard to FIGS. 1 to 9.

Figure 12:
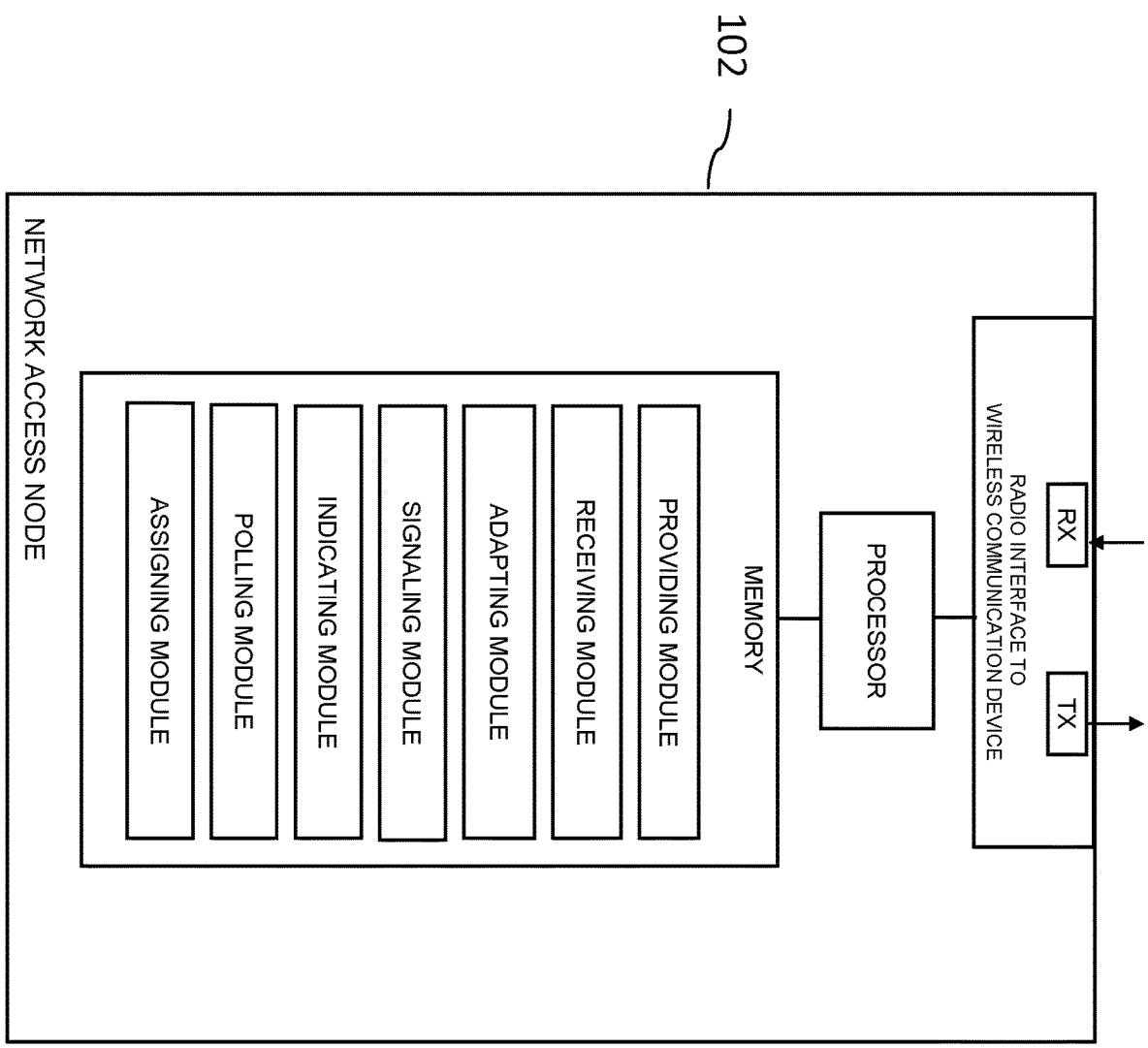
FIG. 12 schematically illustrates exemplary structures for implementing the above-described concepts in a network access node.

Now referring to FIG. 12, exemplary structures for implementing the above-described concepts in a network access node are schematically illustrated.

In the illustrated structure, the network access node 102 includes a radio interface for performing data transmission to and/or from a wireless communication device 101a, 101b, 101c. The modules as depicted in FIG. 12 and as described in the following may be distributed on several network nodes and do not have to be present in a single node or device. For example the providing module, the receiving module, the adapting module, signaling module, the indicating module, the polling module and/or the assigning module may be located in separate (logical) network nodes and/or devices and may be operatively connected to each other.

Nonetheless, it is to be understood that for implementing transmitter (TX) functionalities the radio interface includes one or more transmitters, and that for implementing receiver functionalities (RX) functionalities the radio interface may include one or more receivers.

Further, the network access node includes a processor a memory coupled to the processor and optionally coupled to the radio interface to the wireless communication device. The memory may include a ROM, e.g., a flash ROM, a RAM, e.g., a DRAM or SRAM, a mass storage, e.g. a hard disk or solid state disk, or the like. The memory includes suitably configured program code to be executed by the processor so as to implement the above-described functionalities of the network access node. More specifically, the memory may include a module for accomplishing the provision of providing a plurality of access channels for accessing the network dependent on a traffic type out of a plurality of traffic types. The memory may further include a module for accomplishing the provision of receiving, dependent on a traffic type out of a plurality of traffic types assigned to the data packet, the data packet via one access channel out of the plurality of access channels. The memory may further include a module for accomplishing the provision of adapting the first and/or second and/or the third access channel, especially the respective areas of time and/or frequency resources, in particular based on a quality of service metric. The memory may further include a module for accomplishing the provision of signaling a distribution of time and/or frequency resources reserved for the first, second and/or third access channel to said wireless communication device, e.g. after adjusting the first, second and/or third access channel/area. The memory may further include a module for accomplishing the provision of indicating to the wireless communication device whether the data is to be transmitted via the second and/or third access channel. The memory may further include a module for accomplishing the provision of polling wireless communication devices assigned to the network access node, e.g. in case the contention level on the third access channel exceeds a safeguard threshold of the quality of service metric. The memory may further include a module for accomplishing the provision of assigning a first group of wireless communication devices associated with the network access node to one of the plurality of access channels and assigning a second group of wireless communication devices associated with the network access node to another one of the plurality of access channels.

It is to be understood that the structure as illustrated in FIG. 12 is merely schematic and that the network access node 102 device may actually include further components which, for the sake of clarity, have not been illustrated, e.g., further interfaces or additional processors. Also, it is to be understood that the memory may include further types of program code modules, which have not been illustrated. For example, the memory may include program code modules for implementing typical functionalities of a network access node or program code of one or more applications to be executed by the processor. According to some embodiments, also a computer program product may be provided for implementing concepts according to embodiments disclosed herein, e.g., a computer-readable medium storing the program code and/or other data to be stored in the memory.

The network access node may further comprise one or modules, not shown, for carrying out the embodiments as described with regards to FIGS. 1 to 6.

The invention claimed is:

1. A method performed by a wireless communication device for managing access to a wireless communication network, comprising:
    assigning a traffic type, out of a plurality of traffic types, to a data packet to be transmitted by the wireless communication device, the plurality of traffic types including:
        a first traffic type is dedicated to data packets to be transmitted periodically and/or in real-time,
        a second traffic type is dedicated to data packets to be transmitted according to non-real-time conditions, and
        a third traffic type is dedicated to data packets to be transmitted event-related and/or in real-time;
    selecting a first access channel for a data packet of the first traffic type, said first access channel comprises a first area of time and/or frequency resources;
    selecting a second access channel for a data packet of the second traffic type, said second access channel comprising a second area of time and/or frequency resources;
    selecting a third access channel for a data packet of the third traffic type, said third access channel comprising a third area of time and/or frequency resources; and
    transmitting the data packet via the access channel selected.

2. The method according to claim 1, further comprising:
    obtaining an indication indicating a distribution of time and/or frequency resources reserved for the first, second and/or third access channel, wherein the distribution of time and/or frequency resources reserved for the first, second and/or third access channel is based on a quality of service metric.

3. The method according to claim 2, wherein:
    a total area of time and/or frequency resources encompassed by the first, second and third area of different distributions of the first, second, and third area remains constant; and
    the total area of time and/or frequency resources corresponds to a system bandwidth.

4. The method according to claim 3, wherein the distribution of at least one of the first, second and third areas within the total area is configured dependent on an application requirement.

5. The method according to claim 2, wherein the quality of service metric is based on at least one of the following:
    a buffer status of a data buffer of the wireless communication device containing data to be transmitted in one or more data packets;
    a priority level assigned, by the wireless communication device, to said data packet;
    a contention level for the time and/or frequency resources being assigned to the third access channel, according to the number of wireless devices with third traffic type; and
    an availability of time and/or frequency resources for the third access channel within a system bandwidth.

6. The method according to claim 5, further comprising:
    receiving a poll message in case the contention level on the third access channel exceeds a safeguard threshold of the quality of service metric.

7. The method according to claim 1, further comprising:
    transmitting said data packet in a contention-based manner when the third access channel is selected; and
    transmitting said data packet according to a scheduling grant when the second access channel is selected.

8. The method according to claim 1, further comprising:
    transmitting, via the third access channel, an indication containing information required to adapt the second and/or third access channel and/or to schedule data of the third traffic type.

9. The method according to claim 1, further comprising at least one of:
    assigning data to data packets of the third traffic type and transmitting said data packets via the third access channel, in case the amount of data is below a configurable threshold of the quality of service metric; and
    transmitting data in data packets of the third traffic type via the second access channel, in case the amount of data exceeds a configurable threshold of the quality of service metric.

10. The method according to claim 1, further comprising:
    obtaining an indication whether a data packet is to be transmitted via the second and/or third access channel.

11. The method according to claim 1, further comprising:
    selecting an access channel out of the plurality of access channels, based on a particular group, out of a plurality of groups of wireless communication devices, that the wireless communication device is assigned to.

12. The method according to claim 1, further comprising obtaining an indication indicating time and/or frequency resources of one or more access channels for accessing the wireless communication network.

13. A wireless communication device operative to select, for accessing a wireless communication network, an access channel out of a plurality of access channels for transmission of a data packet based on a traffic type out of a plurality of traffic types assigned to the data packet, the wireless communication device comprising:
    transceiver circuitry;
    at least one processor operatively coupled to the transceiver circuitry; and
    at least one memory storing computer-executable instructions that, when executed by the at least one processor, configures the wireless communication device to perform operations corresponding to the method of claim 1.

14. Method performed by a network access node for managing access to a wireless communication network, comprising:
- providing a plurality of access channels for accessing the network dependent on a traffic type assigned to a data packet,
- wherein the plurality of access channels include:
  - a first access channel comprising a first area of time and/or frequency resources, for the first traffic type,
  - a second access channel comprising a second area of time and/or frequency resources for the second traffic type, and
  - a third access channel comprising a third area of time and/or frequency resources, for the third traffic type; and
- wherein the assigned traffic type is one of the following:
  - a first traffic type dedicated to data packets to be transmitted periodically and/or in real-time,
  - a second traffic type dedicated to data packets to be transmitted according to non-real-time conditions, and
  - a third traffic type dedicated data packets to be transmitted event-related and/or in real-time; and
- receiving a data packet via a particular access channel out of the plurality of access channels, the particular access channel being dependent on the traffic type assigned to the data packet.

15. The method according to claim 14, further comprising adapting the second and/or the third area of time and/or frequency resource based on a quality of service metric, wherein a total area of time and/or frequency resources covered by the first, second, and third area remains constant.

16. Method according to claim 15, wherein the distribution of the first, second and/or third area within the total area is configured dependent on an application requirement, and wherein the total area corresponds to the system bandwidth.

17. Method according to claim 15, wherein the quality of service metric is based on at least one of the following:
- a buffer status of a data buffer containing data to be transmitted in one or more data packets,
- a priority level assigned to said data packet,
- a contention level for the time frequency resources being assigned to the third access channel, according to the number of wireless devices with the third traffic type,
- availability of time and/or frequency resources for the third access channel within a system bandwidth.

18. Method according to claim 15, further comprising:
- signaling a distribution of time and/or frequency resources reserved for the second and/or third access channel to said wireless communication device, after adapting the second and/or third area.

19. Method according to claim 14, wherein:
- the third access channel is configured for one of the following: contention-based network access, and carrier sense multiple access scheme with collision detection; and
- the second access channel is configured for a network access according to a scheduling grant.

20. Method according to claim 14, further comprising:
- receiving, via the third access channel, an indication of the amount of data to be transmitted by one or more data packets and/or the priority level.

21. Method according to claim 14, further comprising:
- receiving one or more data packets via the third access channel, when an amount of data comprising the one or more data packets is below a configurable threshold of the quality of service metric; and
- receiving one or more data packets via the second access channel when the amount of data comprising the one or more data packets exceeds the configurable threshold of the quality of service metric.

22. Method according to claim 14, further comprising:
- indicating to the wireless communication device whether to transmit the data via the second and/or third access channel.

23. Method according to claim 14, further comprising:
- initiating a polling routine for polling wireless communication devices assigned to the network access node in case the contention level on the third access channel exceeds a safeguard threshold of the quality of service metric.

24. A network access node operative to provide a plurality of access channels for accessing a wireless communication network dependent on a traffic type out of a plurality of traffic types assigned to a data packet, the network access node comprising:
- transceiver circuitry;
- at least one processor operatively coupled to the transceiver circuitry; and
- at least one memory storing computer-executable instructions that, when executed by the at least one processor, configures the network access node to perform operations corresponding to the method of claim 14.

* * * * *